Figure 1:
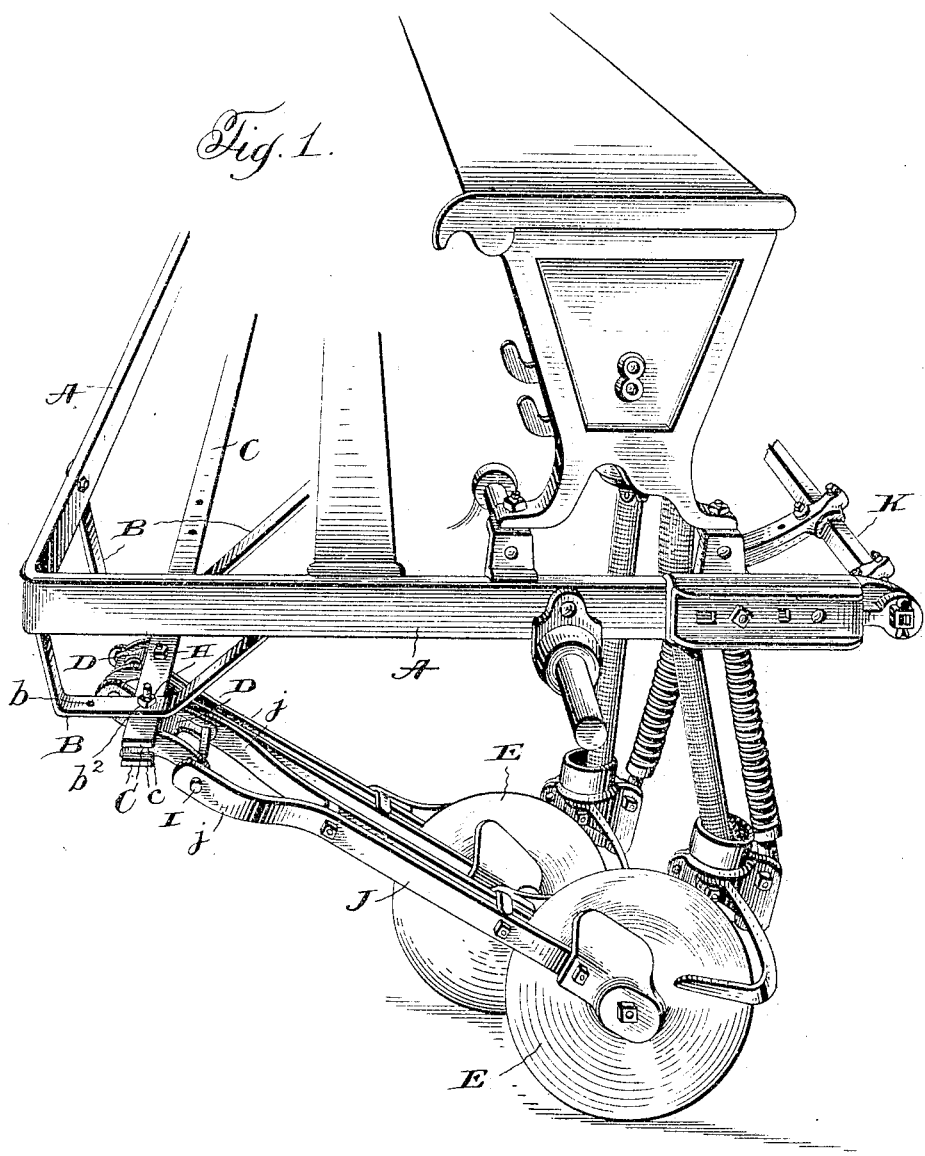

No. 788,037. PATENTED APR. 25, 1905.
W. FETZER.
COUPLING AND DRAW BAR FOR GRAIN DRILLS.
APPLICATION FILED NOV. 19, 1904.

2 SHEETS—SHEET 1.

Witnesses:
Jas. E. Hutchinson
Calvin T. Milans

Inventor:
William Fetzer,
By Milans Attorneys

No. 788,037. PATENTED APR. 25, 1905.
W. FETZER.
COUPLING AND DRAW BAR FOR GRAIN DRILLS.
APPLICATION FILED NOV. 19, 1904.
2 SHEETS—SHEET 2.
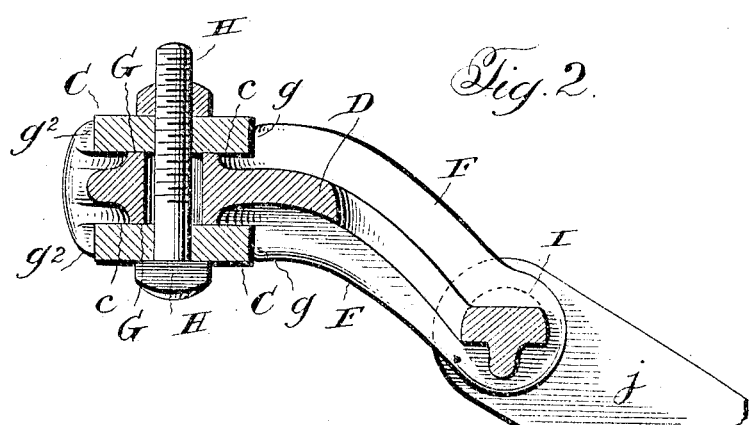
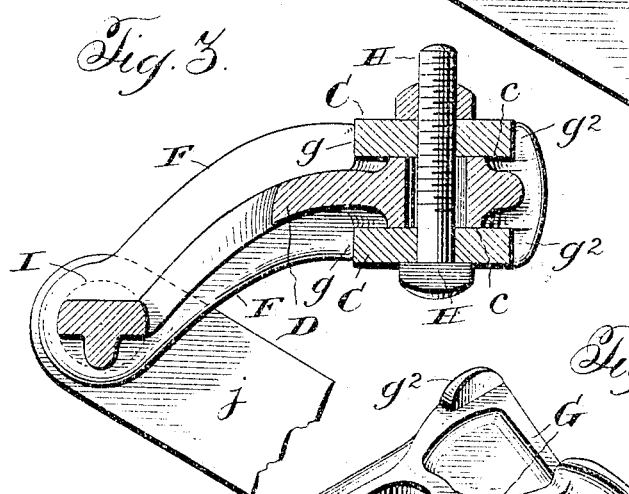
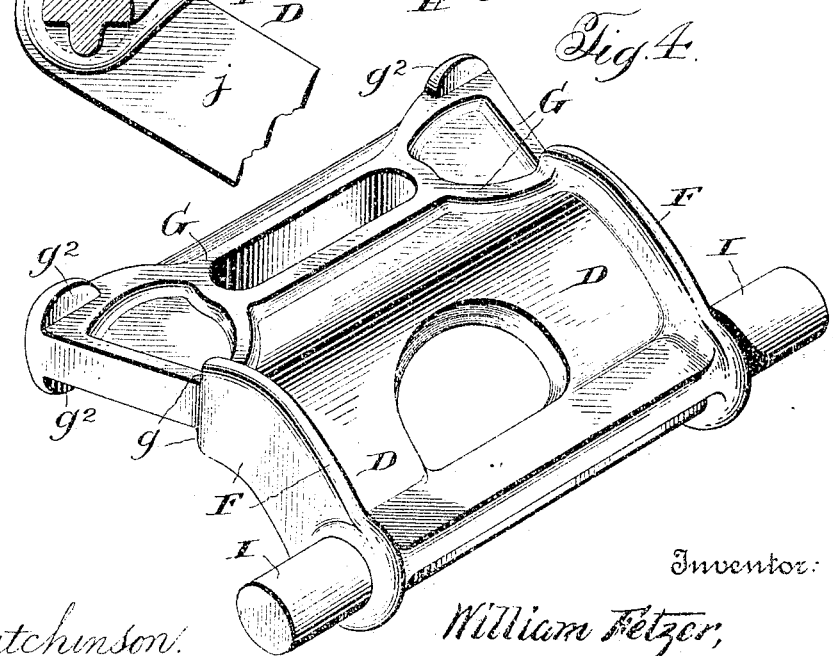
Witnesses
Jas. E. Hutchinson
Calvin T. Milans
Inventor:
William Fetzer,
By ⎯⎯⎯⎯⎯ Attorneys No. 788,037. Patented April 25, 1905.

UNITED STATES PATENT OFFICE.

WILLIAM FETZER, OF MIDDLETOWN, OHIO.

COUPLING AND DRAW-BAR FOR GRAIN-DRILLS.

SPECIFICATION forming part of Letters Patent No. 788,037, dated April 25, 1905.

Application filed November 19, 1904. Serial No. 233,452.

*To all whom it may concern:*

Be it known that I, WILLIAM FETZER, a citizen of the United States, residing at Middletown, in the county of Butler and State of Ohio, have invented certain new and useful Improvements in Couplings and Draw-Bars for Grain-Drills, of which the following is a specification, reference being had therein to the accompanying drawings.

This invention relates to a novel coupling and draw-bar for grain-drills which, although primarily designed for utilization in mounting disk drills whereby they may be disposed in either straight or zigzag relation, is susceptible of use in connection with various types of implements associated with farming machinery, as will be apparent to those skilled in the art.

A convenient embodiment of the invention comprehends a draw-bar in combination with a coupling member having provision for attachment to the drag-bar or shank of an implement and means whereby said coupling member may be secured to the draw-bar to occupy either a projected or retracted position relative to the latter to secure the desired distance between said draw-bar and the implement or a point of contact of the latter with the ground. By the employment of a number of these coupling members in connection with the draw-bar it is obvious that the disks or other implements may be arranged at relatively different distances from the draw-bar, whereby their zigzag disposition is readily obtainable in a structure which also permits the arrangement of said implements in straight lines as occasion therefor arises.

More specifically, the preferred embodiment of the invention comprises a draw-bar composed of two bars (in some instances one bar may be adequate) having relatively flat opposing surfaces and a coupling member having provision for attachment to the drag-bar of an implement and portions adapted to interlock with said bar or bars in either of its reversed positions—*i. e.*, when the coupling member projects either forwardly or rearwardly from the draw-bar—and a fastening device for securing the parts in operative relation. This embodiment of the invention is illustrated in the accompanying drawings, forming part hereof, and upon a consideration of the same in connection with the detailed description hereinafter the improved features of arrangement and detail will be apparent.

In the drawings, Figure 1 is a perspective view of a fragmentary character, showing my improved draw-bar and a series of coupling devices mounted upon a machine. Fig. 2 is a longitudinal sectional view through the draw-bar, showing the coupling in one position. Fig. 3 is a similar view showing the coupling in a retracted position, and Fig. 4 is a perspective view of the coupling member removed.

Referring more specifically to the drawings, wherein like reference characters refer to corresponding parts in the several views, A designates the frame of the machine, and B supporting-brackets depending therefrom at separated points and of sufficient number to afford proper strength. These supporting members each have a forwardly-disposed aperture $b$ and a rearwardly-disposed aperture $b^2$ for a purpose as will hereinafter appear.

C represents a pair of superposed flat steel bars, conveniently of strap metal, constituting a draw-bar and having opposing flat inner surfaces $c$ for contact with couplings to be now defined. These superposed flat bars occupy transversely true horizontal positions, as clearly indicated in Figs. 2 and 3 of the drawings.

D represents the couplings for securing the implements, in the present instance disk drills E, to the draw-bar C. Adjacent to the respective edges of each coupling and on both its upper and lower surfaces are side flanges F, the same being cut away at their upper ends to provide substantially rectangular horizontally-disposed seats G for the reception of the bars C. The shoulders $g$, formed by the cutting away of these flanges, abut one edge of the bars C, while lugs $g^2$ at the upper end of the coupling abut the opposite edge of said bars. By this arrangement it will be noted that the coupling on both its upper and lower surfaces has separated bearing-points against the bars C, whereby any play of the couplings relative to the draw-bar is positively prevented. Centrally-disposed bolts H, passing through alined apertures in the couplings and bars C, and nuts engaging said bolts removably fasten the parts in place. At the lower ends of the castings they are provided with outwardly-projecting stub pintles or pivots I for the separated arms *j* of the drag-bars J of the implements E, whereby the latter are pivoted to rise and fall, as is usual.

It is to be noted that the lower ends of the couplings extend outwardly and downwardly relative to the securing portions thereof having the seats G, before referred to. This is to insure against any interference with the drag-bars on the part of the draw-bar.

Referring now more especially to Fig. 1, wherein the zigzag arrangement of the implements is illustrated, it will be seen that the draw-bar is secured by certain of the removable bolts and nuts H in the rearmost apertures $b^2$ of the supporting-brackets B; also, that the coupling members are alternately arranged and project some forwardly and some rearwardly relative to the draw-bar, whereby the disks are correspondingly arranged at different points from the draw-bar, so that their arrangement in a zigzag fashion is secured.

When it is desired that the disks or implements move in a straight line transversely of the machine, the draw-bars C are shifted to the foremost apertures *b* in the brackets and all of the couplings arranged to project rearwardly therefrom. This ready removal and retracting of the coupling members is a highly desirable feature of my invention, inasmuch as it is simply necessary to remove the securing-bolt, spring the bars C slightly apart, and withdraw any particular coupling from therebetween and reinsert the same after the same manner. In this connection it will also be noted that any number of the couplings and implements may be removed from the machine without in any way affecting those remaining. The importance of this is probably more appreciated when it is remembered that in accordance with the character of work to be performed by the machine the implements can be arranged at varying distances apart, for some purposes a few relatively widely associated implements being sufficient, while in others it being necessary to employ a larger number of relatively closely associated implements. The resultant advantages over the prior art should be obvious.

The object sought by arranging the implements in zigzag fashion is to prevent the catching and accumulation of trash, stones, clods of earth, cornstalks, &c., in front of and between the furrow-openers and the like, which results in serious clogging of the machine in its use under some conditions and in certain portions of the country.

I have hereinbefore stated that when the zigzag arrangement is resorted to and the consequent alternate arrangement of the coupling members necessitated the draw-bar is arranged at the rear of the brackets B, and, on the other hand, when the implements run in a straight line and the couplings all project rearwardly the draw-bar is mounted at the forward portion of said brackets. This is to insure the operation of all of the disks, whether in straight or zigzag arrangement, at a proper angle to the rear presser-bar, (designated at K.)

It is to be understood that the invention is not limited to the disclosure herein made, because many changes and alterations may be made without in the least departing from the spirit of the invention.

Having thus described the invention, what is claimed as new, and desired to be secured by Letters Patent, is—

1. A coupling of the character described having a horizontally-disposed securing portion provided with seats in its upper and lower surfaces adapted to engage a two-part draw-bar, and an outwardly and downwardly extending portion adapted to engage a drag-bar.

2. In a machine of the character described, a draw-bar consisting of a flat metallic member having provision for the attachment thereto of coupling members, said draw-bar occupying transversely a true horizontal position whereby said coupling members may be projected or retracted relative to the draw-bar.

3. In a machine of the character described, a draw-bar consisting of superposed flat metallic members having provision for the attachment therebetween of coupling members, said flat metallic members occupying transversely true horizontal positions whereby said coupling members may be projected or retracted relative to the draw-bar.

4. In a machine of the character described, a draw-bar, an implement, means whereby the implement may be adjustably secured to said draw-bar, brackets, and means for removably securing the draw-bar to said brackets whereby it may be bodily shifted to different positions of adjustment.

5. In a machine of the character described, a draw-bar, a coupling thereon adapted to be projected and retracted relative thereto, an implement connected with said coupling, and means for removably securing the draw-bar in place whereby it may be bodily shifted to different positions of adjustment.

6. In a machine of the character described, a draw-bar, a series of couplings thereon adapted to be projected or retracted relative thereto, implements connected with said couplings, and means for securing the draw-bar in place whereby it may be bodily shifted to different positions of adjustment.

7. In a machine of the character described, the combination with an implement, and its drag-bar, a draw-bar, and a coupling on said draw-bar arranged between the same and said drag-bar and adapted to occupy a projected or retracted position relative to the draw-bar.

8. In a machine of the character described, the combination with a series of implements and their drag-bars, of a draw-bar, and a corresponding series of couplings on said draw-bar one arranged between the same and each drag-bar and adapted to occupy a projected or retracted position relative to the draw-bar.

9. In a machine of the character described, the combination with a series of implements and their drag-bars, a draw-bar and a corresponding series of couplings on said draw-bar one connected with each drag-bar, and instrumentalities whereby any of said coupling members may be projected or retracted relative to the draw-bar independently of the other couplings.

10. In combination with a draw-bar, a coupling thereon adapted to occupy a projected or retracted position relative thereto, and means whereby a drag-bar may be secured to the coupling.

11. In combination with a draw-bar, removable coupling members thereon occupying alternately projected and retracted positions relative to said draw-bar.

12. In combination with a draw-bar, removable coupling members thereon occupying alternately projected and retracted positions relative to said draw-bar, a drag-bar secured to each coupling member, and an implement operatively associated with the drag-bar.

13. A draw-bar of the character described comprising superposed members having opposing surfaces adapted to receive removable couplings therebetween, whereby said couplings may occupy a projected or retracted position relative to the draw-bar, in combination with said removable couplings, means operatively associated with said opposing members for creating a binding pressure therebetween, drag-bars connected to the couplings, and implements operatively associated with the drag-bars.

In testimony whereof I affix my signature in presence of two witnesses.

WILLIAM FETZER.

Witnesses:
G. A. SULLIVAN,
FLOYD CLISE.